3,662,011
ISOMERIZATION OF ALKYL AROMATICS
Saul G. Hindin, Mendham, and Joseph C. Dettling, Jackson, N.J., assignors to Engelhard Minerals & Chemicals Corporation
No Drawing. Filed Dec. 23, 1970, Ser. No. 101,122
Int. Cl. C07c 5/24, 15/02
U.S. Cl. 260—668 A    5 Claims

ABSTRACT OF THE DISCLOSURE

An improvement in a process for the isomerization of alkyl aromatic hydrocarbons over platinum on acidic silica-alumina catalysts comprises incorporating ceria in the catalyst.

BACKGROUND OF THE INVENTION

The present invention relates to an improved catalyst for use in a process for the isomerization of alkyl aromatics. It is particularly concerned with the isomerization of alkyl aromatics containing ethyl-substituted aromatic compounds.

Processes for the isomerization of alkyl aromatic compounds are well known. These processes involve contacting an alkyl aromatic or a mixture of isomers of alkyl aromatics with hydrogen over a catalyst to produce a desired isomer in substantially equilibrium concentration. Subsequently the desired isomer can be separated by chemical or physical means from the mixture and the residual product can be recycled for further processing. It is well known, for example, to utilize this route for producing individual isomers of xylenes from $C_8$ aromatic feeds. Para-xylene in particular is in large demand as a precursor for terephthalic acid, which is used in the production of polyester fibers. Ortho-xylene is used for the production of phthalic anhydride, which is utilized extensively in organic synthesis.

Feedstocks which are processed commercially to obtain the xylenes include $C_8$ aromatic extracts from catalytic reformates and aromatic liquid extracts resulting from the steam cracking of naphtha for ethylene. Compositions of these stocks vary widely, a main difference being their ethylbenzene content. Typically the feeds contain ethylbenzene in the amount of 2 to 30% and higher. Generally the isomerization processes involve contacting a mixture of $C_8$ aromatic hydrocarbons containing ortho-xylene, meta-xylene, para-xylene, and ethylbenzene in non-equilibrium concentrations with hydrogen in the presence of a catalyst at elevated temperature and pressure for a time necessary to convert such mixture to one which approaches equilibrium concentrations. The principal reactions which occur are: isomerization, hydrogenation, dehydrogenation, disproportionation, dealkylation and hydrocracking. The last three reactions result in the loss of product xylenes. A consideration of major importance in such processes is the conversion of ethylbenzene, the isomerization of the xylenes being relatively easy by comparison. If a sizable amount of ethylbenzene contained in the feed is not converted, it will tend to build up on recycle, thereby limiting the unit capacity. The excess material must be diverted through a substantial slip stream, causing wasteful feed losses and lower production. Moreover, it is important not only to convert the ethylbenzene but to convert it to the desired products, i.e. xylenes. Hence, in the isomerization of $C_8$ aromatics it has been the objective to use a catalyst which is highly active and also highly selective for the production of xylenes in order to obtain them in high yields with a minimum of unwanted by-products. Consideration of cost and catalyst life are also important factors.

Many catalysts have been suggested for such aromatic isomerization processes. Generally the catalysts consist of an acidic component and a hydrogenation-dehydrogenation component. These components must be properly balanced for high selectivity.

Among the proposed catalysts are those composed of platinum on amorphous acidic silica-alumina. Amorphous acidic silica-alumina catalysts are well known in the art and are available commercially as cracking catalysts. The meaning of amorphous silica-alumina is well understood in the art. It refers to synthetically prepared catalytic materials which have essentially randomly oriented molecular structures or crystallites too small to show X-ray diffraction patterns. These catalysts were found to be unsatisfactory in that the catalysts become deactivated too rapidly for commercial interest. The formation of coke and increased unwanted side reactions occur as the catalyst is deactivated. To reduce the deactivation of the platinum catalyst, U.S. Patent No. 2,976,332 proposes the use of a catalyst which is platinum deposited on an inert carrier in admixture with a silica-alumina cracking catalyst. It has also been suggested to use as the carrier for the platinum a crystalline aluminosilicate. U.S. Patent No. 3,409,686, for example, proposes the use of a faujasite and mordenite. The crystalline aluminosilicates have been stabilized structurally by the introduction of polyvalent cations including rare earths into the crystalline structure. These catalysts have not been satisfactory mainly in that they are also effective for disproportion of xylenes and thus the yield of xylenes is lowered. Moreover, the crystalline aluminosilicates are more expensive and care must be taken to preserve the crystalline structure.

It is an object of this invention to provide a process for the isomerization of alkyl aromatics in the presence of a catalyst which has long life and superior activity and selectivity. It is another object to provide a process for the isomerization of alkyl aromatics employing an improved catalyst comprising platinum supported on an amorphous silica-alumina carrier. Another object is to provide a catalyst which is particularly effective for the isomerization of ethyl-substituted aromatics. It is a further object to provide an active and selective catalyst for the isomerization of $C_8$ aromatic feedstocks containing ethylbenzene to produce essentially equilibrium mixtures of xylenes with minimum production of by-products. These and other objects will be apparent from the description and claims which follow.

THE INVENTION

In accordance with the present invention an alkyl aromatic feed containing at least one ethyl-substituted aromatic is contacted in the presence of hydrogen and under isomerization conditions with a catalyst consisting essentially of an amorphous acidic silica-alumina carrier, 0.1 to 1.0 weight percent platinum, and 0.01 to 0.1 weight percent ceria, calculated as cerium.

The process of this invention is applicable to the isomerization of isomerizable alkyl aromatic hydrocarbons in the $C_8$ to $C_{12}$ range including, for example, xylenes, ethylbenzene, ethyltoluenes, trimethylbenzenes, cumene, ethylnaphthalenes, and the like, and mixtures thereof. It is particularly useful for feeds containing ethyl-substituted aromatics for the conversion of such ethyl-substituted compounds to methyl-substituted isomers in equilibrium concentrations. Examples of ethyl-substituted alkyl aromatics of this type are ethylbenzenes, ethyltoluenes, diethylbenzenes, ethylnaphthalenes. Presently the process is particularly useful for alkyl aromatic feeds containing $C_8$ and/or $C_9$ aromatics as the predominant components since at this time there is particular interest in the products obtainable from these feeds.

The feedstocks containing the non-equilibrium mixtures of isomerizable alkylaromatics are generally derived as selective fractions from other petroleum conversion processes such as catalytic reforming. Presently most commercial aromatic isomerization processes involve $C_8$ feedstocks. The isomerization of $C_9$ feedstocks for the production of pseudocumene (1,2,4-trimethylbenzene), is becoming of increasing importance. Specific examples of $C_8$ aromatic feeds are:

| Feed (component) | (1) | (2) |
|---|---|---|
| | Percent composition | |
| Ethylbenzene | 14.3 | 26.0 |
| Ortho-Xylene | 22.3 | 22.0 |
| meta-Xylene | 53.8 | 36.4 |
| para-Xylene | 9.6 | 15.6 |

Specific examples of $C_9$ aromatic feeds are:

| Feed (component) | (1) | (2) |
|---|---|---|
| | Percent composition | |
| 2-ethyltoluene | 16.0 | 20.1 |
| 3-ethyltoluene | 31.7 | 39.3 |
| 4-ethyltoluene | 19.4 | 26.2 |
| 1,2,3-trimethylbenzene | 1.2 | 8.6 |
| 1,2,4-trimethylbenzene | 8.6 | 4.5 |
| 1,2,5-trimethylbenzene | 23.1 | 1.3 |

The feeds may also contain small amounts of saturates and aromatics of lower or higher molecular weight. The feeds and reaction conditions for the processes under consideration are well known. Generally isomerization processes of this type are carried out at a temperature within the range of about 400° to 500° C. and at a pressure of about 50 to 500 p.s.i.g., at a weight hourly space velocity of 0.1 to 30, and in the presence of about 3 to 30 moles of hydrogen per mole of isomerizable feed. The selection of conditions within the given ranges generally depends on the economic balance of costs pertaining to catalyst life, hydrocarbon and gas recycle, yield losses, product separation, etc.

As set forth above, the catalysts employed in this invention are composed of an amorphous acidic silica-alumina carrier, platinum, and ceria.

The carrier component of the catalyst is amorphous acidic silica-alumina containing about 10 to 50% alumina. Preferably the silica-alumina has a surface area greater than 200 square meters per gram ($m.^2/g.$). Typically the surface area is about 200 to 500 $m.^2/g$. Methods of preparing such catalysts are well known in the art. Also, commercial cracking catalysts may be used. Currently catalysts of this type are available with 12.5% and 25% alumina. It is preferred, for economic reasons, to use the carrier material with the lower alumina content. The carrier material may be, for example, in the form of pellets, spheres, extrudates, and the like.

The amount of platinum on the silica-alumina carrier is in the range of 0.1 to 1.0%, and preferably 0.25 to 0.5%, by weight based on the weight of the carrier plus the catalyst. The platinum may be deposited by any one of the known methods, e.g. by impregnating the silica-alumina carrier with a suitable solution, e.g. a solution of chloroplatinic acid, drying and calcining the composite.

The ceria is incorporated with the catalyst before, after, or simultaneously with the platinum. Preferably, for reasons of economy the cersia and platinum are co-deposited. Suitably the ceria may be added by impregnation of a soluble salt, e.g. nitrate, acetate, or chloride, which will convert to ceria on calcination. The amount of ceria in the final catalyst should be 0.01 to 0.10% preferably 0.03 to 0.05%, calculated as cerium, based on the weight of the total catalyst composition. The amount of ceria in the catalyst is a critical feature of this invention.

The folowing examples are illustrative of the present invention. In the examples illustrating the process, the feed is essentially composed of ethylbenzene. The purpose of this is to demonstrate the utility of the invention for the isomerization of feeds containing ethyl-substituted aromatic hydrocarbons. As noted above ethyl-substituted aromatic hydrocarbons are components of commercial feedstocks which are particularly difficult to isomerize.

Example 1.—Preparation of Catalyst A

Fifty grams of commercial amorphous cracking catalyst of 87.5% silica-12.5% alumina in the form of $3/32''$ pellets having a surface area of 484 $m.^2/g$. were calcined for 2 hours at 500° C. and then impregnated with an excess of aqueous solution containing 0.687 g. of $H_2PtCl_6$ in 50 ml. of water. To dry the catalyst it was first placed under a heat lamp for 20 minutes and then put in an oven at 110° C. overnight. Thereafter the platinum on silica-alumina was calcined at 400° C. in air. The resultant catalyst composite after calcination contained 0.5% Pt on silica-alumina and had a density of 0.47 g./cc.

Example 2.—Preparation of Catalyst B

This catalyst was prepared using essentially the same procedure as described in Example 1, except that forty grams of the silica-alumina pellets were impregnated with an excess of aqueous solution containing 0.0682 g. $Ce(NO_3)_3 \cdot 6H_2O$ and 0.5500 g. $H_2PtCl_6$ in 37 ml. of water. The resultant co-deposited catalyst after calcination contained 0.5% Pt and 0.05% ceria (calculated as cerium) on silica-alumina and had a density of 0.47 g./cc.

Example 3

Catalysts A and B were tested for isomerization as follows:

About 20 grams of catalyst were placed in a one inch inside diameter Universal stainless steel reactor tube dispersed with sufficient 8 to 14 mesh inert tabular alumina to provide a catalyst zone of about 250 cubic centimeters volume. The reactor, after each charging, was placed in a bronze-block furnace controlled by thermostats. Bed temperatures were measured by means of platinum and platinum-rhodium thermocouples. The charge of catalyst was purged with nitrogen gas and then reduced for two hours in a slow stream of hydrogen gas at about 900° F. (482° C.) and atmospheric pressure.

The feed, a mixture containing over 95% ethylbenzene, was mixed with hydrogen and contacted with the catalyst at a temperature of about 850° F. and a pressure of 175 p.s.i.g. at a weight hourly space velocity of about 0.6. Contact time with the catalyst was roughly 13 seconds.

The feed mixture passed over the catalyst through the bed and the effluent was passed to a small volume high pressure receiver. In order to minimize both holdup and flow upsets in the small volume system, the total net product was continuously removed from the receiver using an air-operated flow control valve actuated by a back pressure recorder-controller. The total net product so removed was fed continuously into a product stabilizer to give a $C_5^+$ liquid product and a $C_4^-$ gas. The gas from the stabilizer was metered and then sampled by diverting a portion into an evacuated butyl rubber gas sample bag using a timer actuated solenoid valve. The remainder was passed through a bubbler containing phenolphthalein in water.

The feed system was a conventional pressure drop system including an alumina dryer. The feed was measured volumetrically. The feed dryers reduced the water content of the total feed to the unit to less than 50 parts of water per million parts by volume of total feed in vapor phase.

Analysis of both gas and liquid samples for $C_1$ through $C_5$ hydrocarbons was by gas chromatography. Analysis of gas samples for hydrogen was by Orsat. All components of a gas sample were determined independently and then summed as a check against errors. All gas analyzers were converted to an air-free basis before use in yield calculations.

The hydrocarbon feed charged to the unit contained 96.8 volume percent ethylbenzene (with the balance primarily xylenes), 0.6 part per million of sulfur, and about one-tenth of one par per million of nitrogen in the form of organic nitrogen. The system was pressured with hydrogen, which was essentially free of nitrogen, and brought up to temperature. The operating conditions, yields and product inspection data for the tests are shown in the following Tables I and II.

Table I shows a tabulation of the results with Catalyst A, a conventional catalyst composed of 0.5% Pt on commercial silica-alumina, as described above. Table II shows a tabulation of the results with Catalyst B, a catalyst of this invention, having the same components as the conventional catalyst and in addition 0.05% of ceria. In the tables yields are given as the percent on feed and were calculated on the basis of 100% recovery.

TABLE I.—TEST USING CATALYST A

Operating conditions:
 Temperature=849° F.
 Pressure=175 p.s.i.g.

| Time on stream (hours) | 6/14 | 14/22 | 22/30 | 30/38 |
|---|---|---|---|---|
| Mole ratio | 19.94 | 91.95 | 19.95 | 19.93 |
| Make up $H_2$/HC | | | | |
| WHSV | .645 | .645 | .645 | .645 |
| Contact/Time (sec.) | 13.04 | 13.03 | 13.05 | 13.05 |
| Analysis, wt. percent: | | | | |
| Benzene | 5.44 | 5.61 | 5.01 | 4.93 |
| Toluene | 8.07 | 8.85 | 8.90 | 8.42 |
| o-xylene | 15.59 | 15.11 | 14.94 | 14.08 |
| m-xylene | 33.43 | 32.64 | 31.67 | 31.30 |
| p-xylene | 15.44 | 14.74 | 14.62 | 14.25 |
| Ethylbenzene | 13.12 | 15.52 | 17.10 | 19.79 |
| $C_9$+ Aromatic | 6.04 | 4.44 | 4.69 | 4.85 |
| Distribution of $C_8$ basis: | | | | |
| o-xylene | 20.10 | 19.37 | 19.07 | 17.73 |
| m-xylene | 43.09 | 41.84 | 40.43 | 39.41 |
| p-xylene | 19.90 | 18.90 | 18.66 | 17.94 |
| Ethylbenzene | 16.91 | 19.89 | 21.83 | 24.92 |
| Yield: | | | | |
| $H_2$, wt. percent | 0.05 | 0.05 | 0.05 | 0.05 |
| $C_1$-$C_4$, wt. percent | 13.8 | 13.9 | 14.0 | 14.1 |
| $C_5$+, wt. percent | 86.2 | 86.1 | 86.0 | 85.9 |
| Disappearance, wt percent: | | | | |
| Ethylebezene | 89 | 87 | 85 | 83 |
| $C_8$ Aromatic | 33 | 33. | 33 | 32 |

TABLE II.—TEST USING CATALYST B

Operating conditions:
 Temperature=850° F.
 Pressure=175 p.s.i.g.

| Time on stream (hours) | 6/14 | 14/22 | 22/30 | 30/38 |
|---|---|---|---|---|
| Mole ratio | 20.37 | 20.06 | 19.86 | 20.03 |
| Make up $H_2$/HC | | | | |
| WHSV | .579 | .590 | .590 | .590 |
| Contact time (sec.) | 13.02 | 12.94 | 13.07 | 12.97 |
| Analysis, wt. percent: | | | | |
| Benzene | 3.94 | 2.41 | | 2.37 |
| Toluene | 5.09 | 4.42 | | 3.68 |
| o-Xylene | 17.31 | 17.09 | | 16.72 |
| m-Xylene | 37.61 | 37.75 | | 36.06 |
| p-Xylene | 17.18 | 17.23 | | 16.53 |
| Ethylbenzene | 8.01 | 9.39 | | 12.48 |
| $C_9$+ aromatic | 5.07 | 5.31 | | 5.20 |
| Distribution on $C_8$ basis: | | | | |
| o-Xylene | 21.61 | 21.00 | | 20.44 |
| m-Xylene | 46.94 | 46.39 | | 44.09 |
| p-Xylene | 21.45 | 21.07 | | 20.21 |
| Ethylbenzene | 10.00 | 11.54 | | 15.26 |
| Yield: | | | | |
| $H_2$, wt. percent | 0.03 | 0.03 | | 0.03 |
| $C_1$-$C_4$, wt. percent | 9.8 | 8.7 | | 8.2 |
| $C_5$+, wt. percent | 90.2 | 91.3 | | 91.8 |
| Disappearance, wt. percent: | | | | |
| Ethylbenzene | 93 | 91 | | 88 |
| $C_8$ aromatic | 28 | 26 | | 25 |

Reference to Tables I and II shows the marked improvement using Catalyst B, containing 0.05% ceria over the run using Catalyst A, the conventional catalyst. At 850° F. the equilibrium concentration of ethylbenzene is about 8.5% on a $C_8$ basis. Using the conventional type catalyst (Table I) the approach to equilibrium in the first 6–14 hour period of operation is less than 91% and it deteriorates by 9% to 82% in the 30–38 hour period. Using the ceria-promoted catalyst the approach to equilibrium is closer to 98% during the first 6–14 hours and only drops approx. 6%, remaining close to 92% as measured during the 30–38 hour period.

Table I also shows that the average $C_8$ disappearance was roughly 32–33% for the first 38 hours of the run with the conventional type catalyst. Comparing this with the run using the ceria-promoted catalyst in accordance with this invention (Table II), it can be seen that the process was greatly enhanced; the average disappearance was about 26% during the same time period, even though the conversion level was much higher.

The activity and selectivity of the catalysts for isomerization of ethylbenzene (EB) are calculated as follows:

$$\text{activity} = \text{EB Disappearance (Percent)}$$

$$\text{selectivity} = \frac{\text{EB Disappearance (Percent)}}{C_8 \text{ Disappearance (Percent)}}$$

The activity and selectivity of Catalysts A and B are tabulated below. Included in the tabulation are results obtained with Catalyst C and Catalyst D. Catalysts C and D were prepared in a similar manner to Catalyst B, except with different amounts of ceria, as noted below in Table III. All catalysts contained 0.5% Pt on silica-alumina based on the weight of Pt plus silica-alumina.

TABLE III

| Catalyst | Ceria (percent by wt.) | Results Activity | Results Selectivity |
|---|---|---|---|
| A | 0 | 85 | 2.6 |
| B | 0.05 | 91 | 3.5 |
| C | 0.01 | 86 | 2.4 |
| D | 0.10 | 81 | 2.8 |

A comparison of the results for Catalysts A and B shows that Catalyst B (of this invention) exhibited an increase in activity of 6 units and in selectivity of 0.9 unit i.e., over 34% increase in selectivity. The 6 unit activity increase is important in that the unreacted feed recycle is cut almost in half (9% vs. 15%). The increase in selectivity is, of course, a further major improvement.

It will be noted from Table III that Catalyst C having 0.01% ceria showed a slight improvement in activity and Catalyst O showed a silght improvement in selectivity. Catalyst B, having a ceria content of 0.05%, which is in the preferred range, showed a marked superiority in activity and selectivity.

What is claimed is:

1. A process for the isomerization of a $C_8$ to $C_{12}$ alkyl aromatic hydrocarbon feed containing at least one ethyl-substituted aromatic hydrocarbon which comprises contacting such feed in the presence of hydrogen and under isomerization conditions with a catalyst consisting essentially of an amorphous acidic silica-alumina carrier containing about 10 to 50% alumina and having a surface area of at least about 200 m.²/g., 0.1 to 1.0 weight percent of platinum, and 0.01 to 0.1 weight percent ceria, calculated as cerium.

2. A process of claim 1 wherein the isomerization is effected at a temperature of 400 to 500° C., a pressure of 50 to 500 p.s.i.g., a weight hourly space velocity of 0.1 to 30, and at a ratio of 3 to 30 moles of hydrogen per mole of isomerizable feed.

3. A process of claim 1 wherein the ceria is present in the catalyst in the amount of about 0.03 to 0.05 weight percent based on the total weight of the catalyst plus the support.

4. A process of claim 1 wherein the alkyl aromatic hydrocarbon feed is composed predominantly of $C_8$ aromatics and such feed contains ethylbenzene.

5. A process of claim 1 wherein the alkyl aromatic hydrocarbon feed is composed predominantly of $C_9$ aromatics and such feed contains an ethyltoluene.

References Cited

UNITED STATES PATENTS

| 3,370,099 | 2/1968 | Plank et al. | 260—668 A |
| 3,525,775 | 8/1970 | Bolton et al. | 260—668 A |
| 3,551,509 | 12/1970 | Thomas et al. | 260—668 A |
| 3,578,723 | 5/1971 | Bowes et al. | 260—668 A |

CURTIS R. DAVIS, Primary Examiner